A. J. NOE.
Improvement in Corn-Planters.
No. 132,770.                  Patented Nov. 5, 1872.
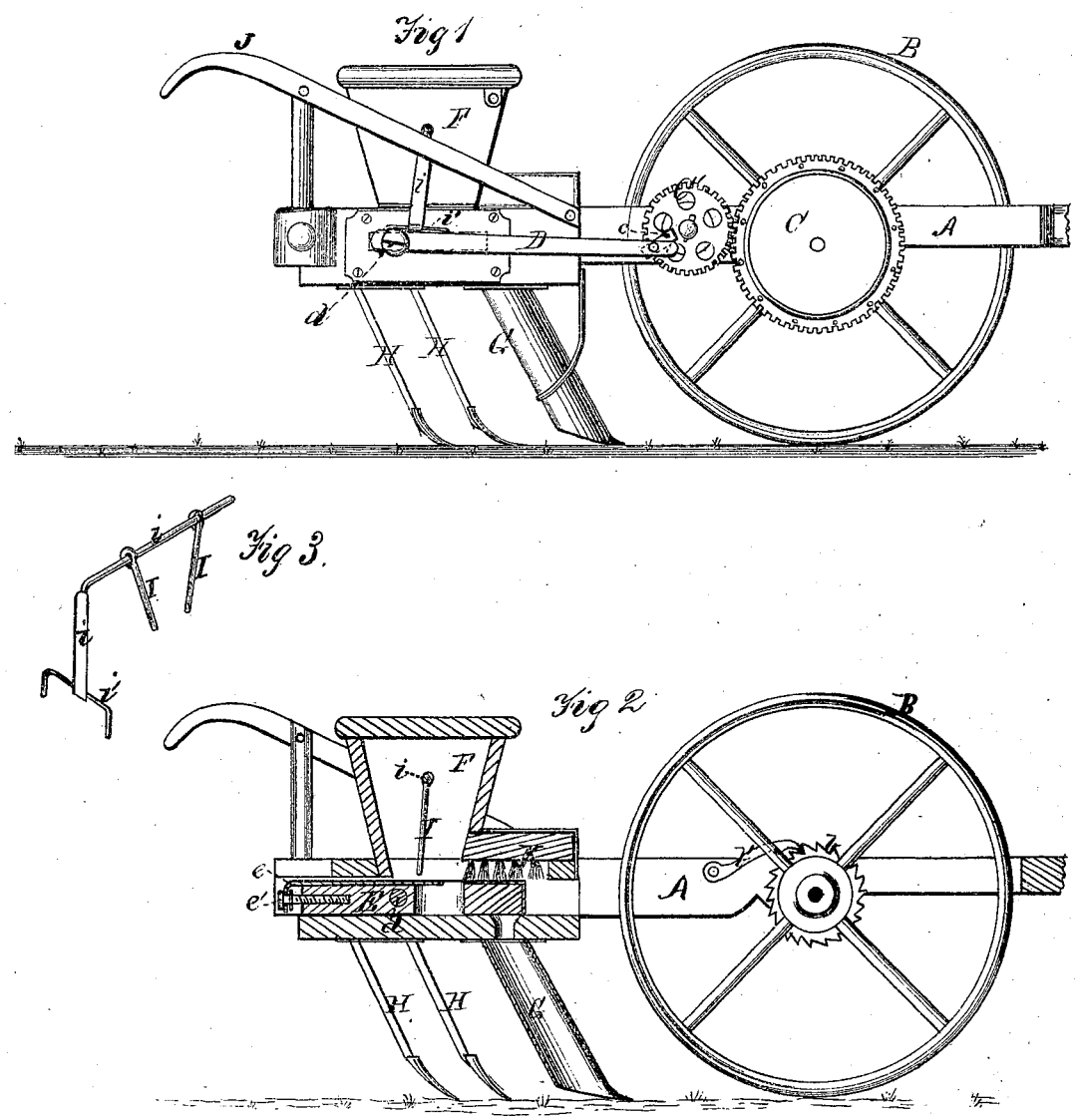

UNITED STATES PATENT OFFICE.

ANDREW JACKSON NOE, OF MITCHELL, INDIANA.

IMPROVEMENT IN CORN-PLANTERS.

Specification forming part of Letters Patent No. 132,770, dated November 5, 1872.

*To all whom it may concern:*

Be it known that I, ANDREW JACKSON NOE, of Mitchell, Lawrence county, and State of Indiana, have invented a certain Improvement in Corn-Planters, of which the following is a specification:

In the annexed drawing, Figure 1 represents a side view of my improved corn-planter; Fig. 2 represents a longitudinal section of a portion and a side view of the other portion of the same; and Fig. 3 is a perspective view of the agitators or stirrers and their crank-bar, which is supplied with prongs, between which passes the right-angular bar to which the seed-slide and the pitman for operating said slide are attached.

In the several figures identical parts are designated by corresponding letters of reference.

This invention appertains to an improved corn-planter; and it consists of the distributors or agitators for aiding the escape of the corn through the hopper while being fed to the leg through which the corn passes from the hopper to the ground.

To enable others to make and use my invention, I will proceed to describe it.

In the accompanying drawing, A refers to a longitudinal bar, of which there are two, connected together in any suitable manner and by any desired means, and which receive the large transporting and driving wheel B, the axle of the latter passing through each of the said bars A. Upon the axle of and on one side of the wheel B is a ratchet, *b*, with which engages a pawl, *b'*, attached to the bar A, the object of which being to prevent the said wheel from revolving when the machine is being moved backward. Upon the projecting end of the axle of the wheel B is a cog-wheel, C, which gears with a smaller cog, C', having a crank-shaft, *c*, to which one end of the pitman D is connected, the opposite end of the latter being connected by a right-angular bar or stud, *d*, to the corn-dropping slide, E. A screw is supplied to the stud *d*, so as to permit of the said pitman being readily attached to and detached from it or the said slide. The slide E is supplied with an elongated aperture for the passage of the corn, the size of which is susceptible of being varied by means of a metallic slide or cover, *e*, which moves within a recess cut in the said slide E, and made with a slot in its rear or right-angular end to receive a headed projection or screw, *e'*. By varying the size of this aperture the corn-dropping process may be regulated. F refers to the hopper for the reception of the corn to be dropped, the bottom of which is left open, or supplied with a longitudinal opening, through which the corn may pass to the dropping-slide E, interposed between the said hopper and the leg or spout, through which the corn is conducted to the ground. G refers to the leg or spout, above alluded to, which is of ordinary construction, and suitably fastened to the under side of the machine by a metallic loop or otherwise, and in a line with the corn-dropping opening. In the rear of the leg G, and a little to either side of the same, are placed two or more plow-shovels, H H, which are fastened by any suitable means to the lower side of the bars A, and arranged out of line with each other, or in any other required manner. I I refer to the distributers or agitators, which consist of two or more straight bars or pendants fastened to and suspended from a horizontal shaft, *i*, which shaft has its bearings in apertures or boxes in the sides of the hopper F, and caused to extend downwardly outside of the latter to a point contiguous to the pitman D, where it is supplied with a right-angular bar having a prong at each end, which prongs being so arranged or located with reference to the stud *d*, as that when the corn-dropping slide to which it is attached is in operation, they will be struck by the said stud in its backward and forward movement produced by the strokes of the pitman, and thus give momentum to the said distributors. By this arrangement it will be observed that the same source, and in part the same means, from and through which motion is communicated to the corn-dropping slide, are also used to give motion to the distributors or agitators, thus insuring simplicity and cheapness of construction. J J refer to the handles of the machine, suitably attached and braced thereto. A brush, K, is incased directly over the corn-slide E, and is for the purpose of removing dirt from the corn.

Having thus fully described my invention, what I claim, and desire to secure by Letters Patent, is—

The combination of the distributers I I, shaft $i$, and bar $i'$, with the pitman D and stud $d$, attached to the corn-dropping slide, substantially as and for the purpose specified.

In testimony whereof I have hereunto signed my name this 13th day of August, A. D. 1872, in presence of two subscribing witnesses.

ANDREW JACKSON NOE.

Witnesses:
   JAS. H. BUSICK,
   JOHN W. MANINGTON.